(12) United States Patent
Hariharan et al.

(10) Patent No.: US 8,886,771 B2
(45) Date of Patent: Nov. 11, 2014

(54) METHOD AND SYSTEM FOR PROVIDING DISTRIBUTED ALLOWED DOMAINS IN A DATA NETWORK

(75) Inventors: Anand Hariharan, San Jose, CA (US); Christian Sasso, Milpitas, CA (US); Ronak Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1876 days.

(21) Appl. No.: 11/383,431

(22) Filed: May 15, 2006

(65) Prior Publication Data

US 2007/0266132 A1    Nov. 15, 2007

(51) Int. Cl.
   *G06F 15/177* (2006.01)
   *H04L 29/12* (2006.01)
(52) U.S. Cl.
   CPC ...... *H04L 61/2038* (2013.01); *H04L 29/12254* (2013.01); *H04L 61/2046* (2013.01); *H04L 29/12283* (2013.01); *H04L 61/6045* (2013.01); *H04L 61/2061* (2013.01); *H04L 29/12264* (2013.01); *H04L 29/12886* (2013.01)
   USPC .......................................... 709/220; 709/221
(58) Field of Classification Search
   CPC ................................................. H04L 61/6045
   USPC ................... 709/220–223; 349/144; 707/204; 726/26
   See application file for complete search history.

(56) References Cited

U.S. PATENT DOCUMENTS

| | | | |
|---|---|---|---|
| 6,016,512 A * | 1/2000 | Huitema ........................ | 709/245 |
| 6,765,919 B1 * | 7/2004 | Banks et al. .................. | 370/401 |
| 7,327,744 B2 | 2/2008 | Agrawal et al. | |
| 7,433,300 B1 | 10/2008 | Bennett et al. | |
| 7,484,021 B2 | 1/2009 | Rastogi et al. | |
| 7,499,410 B2 | 3/2009 | Dutt et al. | |
| 7,512,123 B1 | 3/2009 | DeSanti et al. | |
| 2004/0210479 A1* | 10/2004 | Perkowski et al. ............. | 705/14 |
| 2005/0025075 A1 | 2/2005 | Dutt et al. | |
| 2005/0086332 A1* | 4/2005 | Nakazawa .................... | 709/223 |
| 2005/0120246 A1* | 6/2005 | Jang et al. ..................... | 713/201 |
| 2006/0235985 A1* | 10/2006 | Ramkumar et al. .......... | 709/229 |
| 2007/0058620 A1* | 3/2007 | Willeke et al. ................ | 370/386 |
| 2007/0067589 A1 | 3/2007 | Mishra et al. | |
| 2007/0180497 A1* | 8/2007 | Popescu et al. .................... | 726/4 |
| 2009/0073992 A1* | 3/2009 | Makishima et al. .......... | 370/400 |

FOREIGN PATENT DOCUMENTS

JP     02005277623 A  * 10/2005

OTHER PUBLICATIONS

Translated abstract of JP02005277623A.*
"Cisco MDS 9000 Family Release Notes for Cisco MDS SAN-OS Release 3.0(1)," Cisco Systems, Inc., Apr. 17, 2006, pp. 1-56.
"Inter-VSAN Routing With the Cisco MDS 9000 Family of Switches and Cisco SAN-OS 2.1," Cisco Systems, Inc., Apr. 2005, pp. 1-7.

* cited by examiner

*Primary Examiner* — Kevin Mai

(57) ABSTRACT

Method and system for providing distributed domains in a fiber channel fabric including determining a domain configuration of a resource, retrieving one or more current domain configuration parameters, determining a list of domains in a fiber channel fabric, and generating an updated domain list for the resource in the fabric is disclosed.

28 Claims, 7 Drawing Sheets

METHOD AND SYSTEM FOR PROVIDING DISTRIBUTED ALLOWED DOMAINS IN A DATA NETWORK

FIELD OF THE INVENTION

The present invention relates to network management. More specifically, the present invention relates method and system for providing distributed domains in a data network.

BACKGROUND

A fibre channel fabric typically uses a set of interconnected host bus adapters ((HBAs) which connects a host in/out bus to a computer terminal's memory), bridges, storage devices and switches. A storage area network (SAN) installation may include multiple fabrics for redundancy. Typically, a fabric may be considered as a set of switches sharing inter-switch links (ISLs) together with the devices to which they are connected. A SAN with multiple switches not connected by ISLs provide multiple fabrics.

In a fibre channel, device addressing may be handling in one of several ways. The first approach uses the worldwide name (WWN) of the device which is a 64-bit address that uniquely identifies each device globally to ensure that no duplicate WWNs are in the fibre channel network. This is commonly used to make basic user-level management changes such as zoning for device access. Another approach uses fibre channel identification (FCID) which is 24-bit and is configured to be a dynamic address assigned by the fabric when a device logs in to reduce complexity of addressing for internal use by the fabric.

More specifically, the FCID includes three components—the domain, the area and the port. The domain is a unique number assigned to each switch in a logical fabric. A domain ID assigned to a switch may range, for example, from 1 to 239. This number includes the first 8 bit of the FCID. The area is an 8-bit area field which is assigned by the switch also. The area can range from 0 to 255. In some cases, the area may be assigned by using the physical port number (for example, port 3 out of 16 ports) limiting availability in some operating systems. The port field is also 8 bits and ranges from 0 to 256, in one example. The port field is unique in that it also is used to assign the arbitrated loop physical address (ARPA) for devices that use loop. When arbitrated loop is not used, the port field may be set to 0.

Using the domain, the area and the port fields, each device is assigned a 24 bits of FCID when it logs into the fabric, and is used as a simplified addressing scheme, replacing the WWN internally to the fabric including the name server queries to routing. While WWNs are unique globally, FCIDs are required to be unique only within the logical fabric in which they are assigned.

With the increase in the scale of storage area network (SAN) configurations and SAN consolidations, reducing the number of physical networks while increasing the number of switches in these networks raises a significant domain ID assignment issue. In many environments, domain IDs already overlap in different physical infrastructures as a result of, for example, the large size of the SAN, or miscalculation of how fast SANs would expand in the environment.

Currently, in a fibre channel fabric, there is provided one principal switch which is configured to assign unique domains to all switches in the fabric. If the requested domain is not available or a request for a non-specific domain (e.g., a request for 0) is received by the principal switch, then the principal switch is allowed to assign any available domain to the request. Such domain assignment may raise compatibility issues with other switches (for example, with the interop mode where domains outside the range of 91-127 may not be assigned). Also, in certain cases, inter-VSAN routing (IVR) may be adversely effected where some domains used in transit VSANs need to avoid assignment in the local VSAN.

In view of the foregoing, it would be desirable to have methods and systems for providing distributed allowed domains in a fiber channel fabric to potentially avoid conflicts or other adverse network management related issues.

SUMMARY OF THE INVENTION

Accordingly, the various aspects of the present invention include method and system for providing distributed allowed domains in a fiber channel fabric including determining a domain configuration of a resource, retrieving one or more current domain configuration parameters, determining a list of domains in a fiber channel fabric, and generating an updated domain list for the resource in the fabric. The updated domain list may include allowed domain list or disallowed domain list.

These and other features and advantages of the present invention will be understood upon consideration of the following detailed description of the invention and the accompanying drawings.

DETAILED DESCRIPTION

Figure 1:
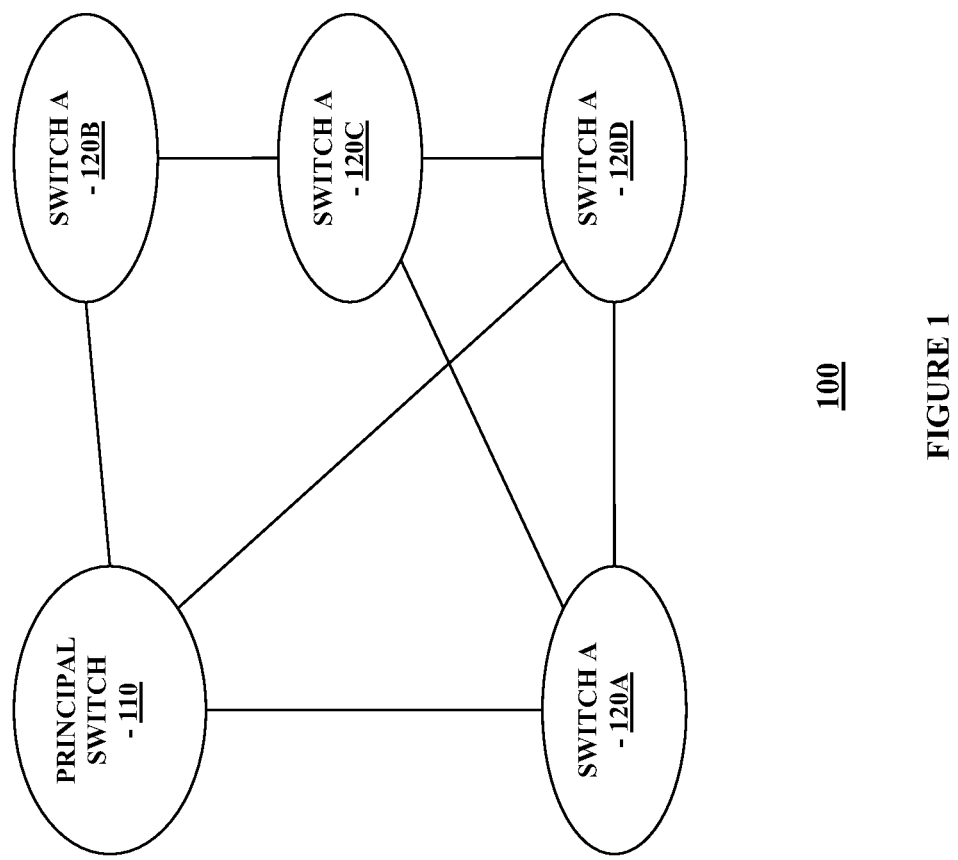
FIG. 1 is a block diagram of fiber channel fabric for practicing one or more embodiments of the present invention.
Figure 2:
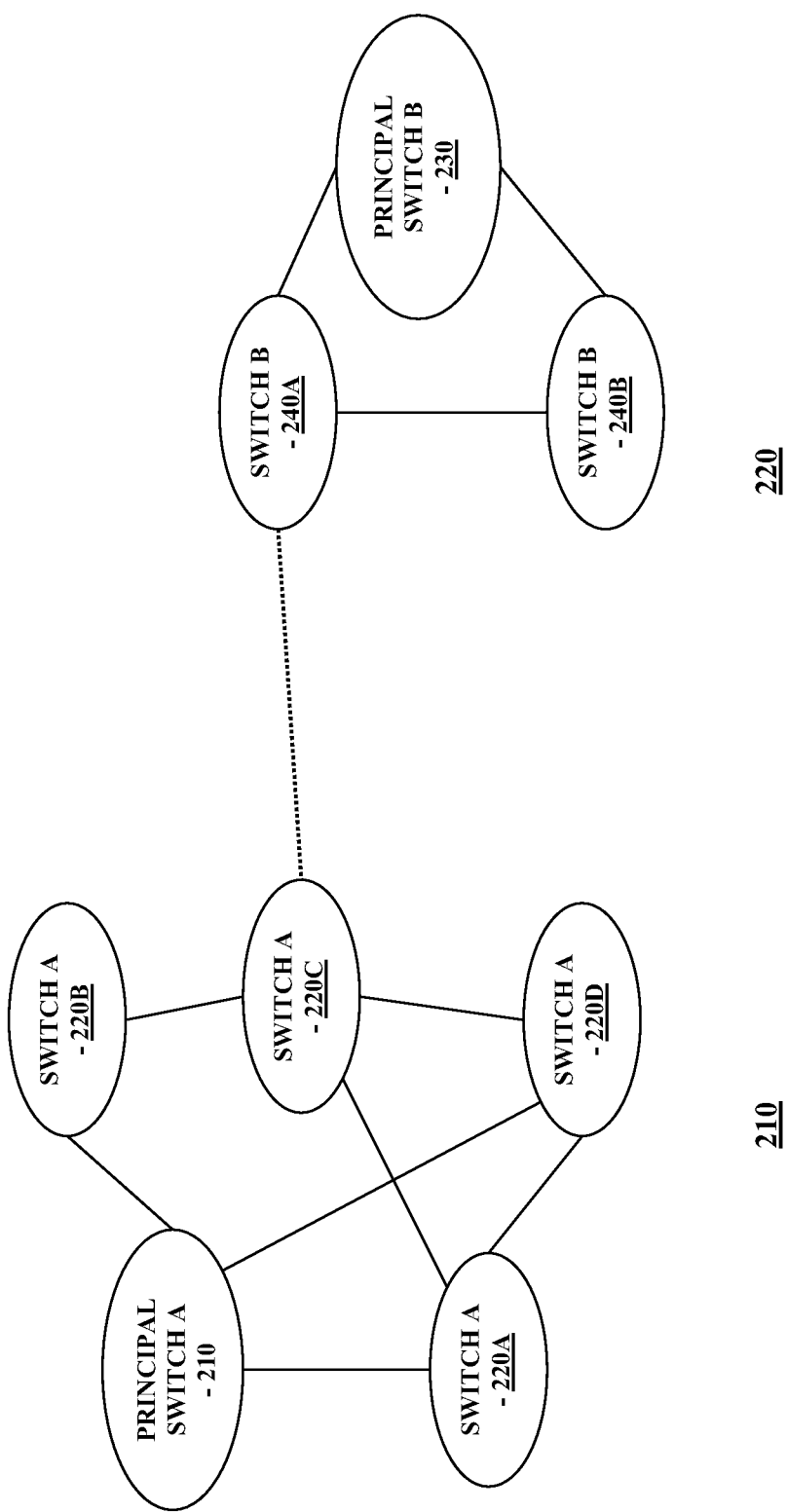
FIG. 2 is a block diagram of a fiber channel fabrics configured to merge in accordance with one embodiment of the present invention.

FIG. 1 is a block diagram of fiber channel fabric for practicing one or more embodiments of the present invention. Referring to FIG. 2, a logical topology of a fiber channel fabric 100 includes a principal switch 110 configured to connect to a plurality of subordinate switches A 120A, 120B, 120C, 120D. Each subordinate switch A 120, 120B, 120C, 120D is configured to be assigned with a unique allowed domain requested from the principal switch which, in response to the request for the domain, in one aspect, sequentially assigns one of available domains from the allowed domain list, for example, from 1 to 239.

As discussed in further detail below in conjunction with FIGS. 3-5, in one aspect of the present invention, the principal switch 110 in the logical topology of the fiber channel fabric 100 shown in FIG. 1 may be configured with a restricted range of allowable and assignable domains within the fabric 100, and further, configured to assign from the allowed list of domains to the subordinate switches A 120A, 120B, 120C, 120D in the fibre channel fabric 100.

FIG. 2 is a block diagram of a fiber channel fabrics configured to merge in accordance with one embodiment of the present invention. Referring to FIG. 2, a logical topology of two fiber channel fabrics 210, 220 are shown, where fabric 210 includes a principal switch A 210 configured to connect to a plurality of subordinate switches A 220A, 220B, 220C, 220D, and further, where fabric 220 includes a principal switch B 230 which is configured to connect to a plurality of subordinate switches B 240A, 240B.

Referring to FIG. 2, as can be seen, fabric 210 and fabric 220 may be configured to merge based on fabric admission control process as described in further detail below in conjunction with FIGS. 6A-6B. More specifically, in one embodiment of the present invention, fiber channel fabric 210 and fiber channel fabric 220 may be configured to merge as shown by the dotted line connecting the subordinate switch A 220C in the fiber channel fabric 210 and the subordinate switch B 240A in the fiber channel fabric 220 based on the distributed allowed domain approach described in conjunction with FIGS. 3-5 below.

Figure 3:
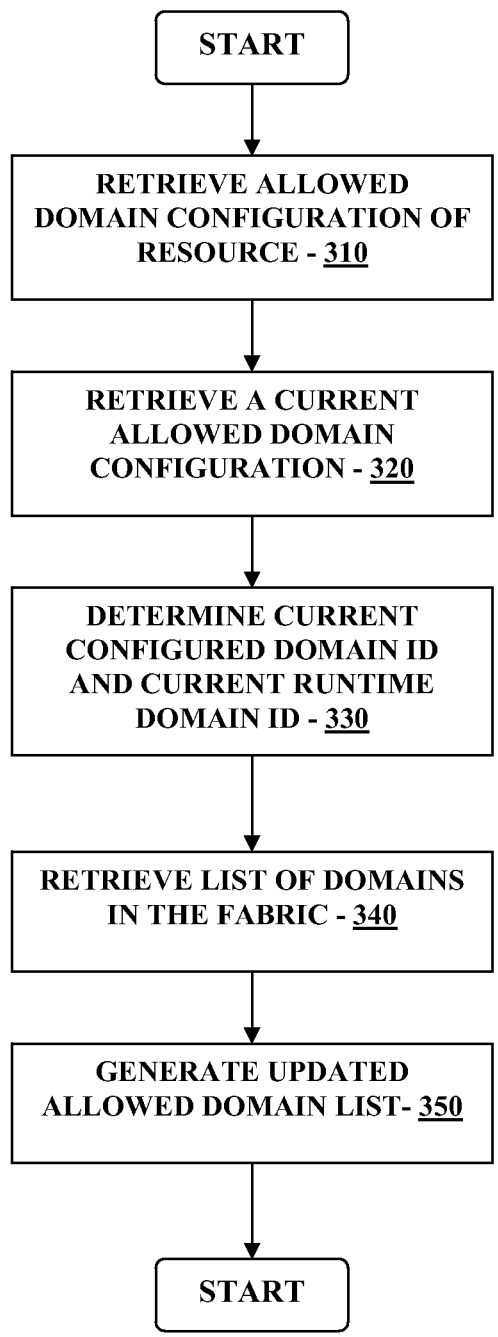
FIG. 3 is a flowchart illustrating the determination of the range of allowable assignable domains within a fabric in accordance with one embodiment of the present invention.

FIG. 3 is a flowchart illustrating the determination of the range of allowable assignable domains within a fabric in accordance with one embodiment of the present invention. Referring to FIG. 3, at step 310, the allowed domain configuration for resource is retrieved. For example, the allowed domain configuration may include the range 1-75. Thereafter at step 320, a current allowed domain configuration is retrieved. For example, the current allowed domain configuration may include the range 50-115.

Referring back to FIG. 3, after retrieving the current allowed domain configuration at step 320, the current configured domain ID and the current runtime domain ID is determined at step 330. For example, the current configured domain ID may be 55, and the current runtime domain ID may be 75. Thereafter, at step 340, the list of domains in the fabric is retrieved. For example, the list of domains may include 50, 60, and 75. After retrieving the list of domains in the fabric at step 340, the updated allowed domain list is generated at step 350 based on, for example, a comparison of the allowed domain configuration retrieved at step 310 and the current allowed domain configuration retrieved at step 320, taking into account the list of domains in the fabric retrieved at step 340.

In the example provided above, with the allowed domain configuration of 1-75, and the current allowed domain configuration of 50-115, the intersection of the domain ranges results in the final updated allowed domain list of 50-75. That is, the intersection of the allowed domain configuration (1-75) and the current allowed domain configuration (50-115), and the range which encompasses the list of domains in the fabric (50, 60, 75), results in the updated allowed domain list of 50-75.

In this manner, in one embodiment of the present invention, referring back to FIG. 1, the principal switch 110 may be configured to have a restricted subset of allowable list of domains that are assignable to the subordinate switches A 120A, 120B, 120C, 120D in the fiber channel fabric 100. It should be noted that while four subordinate switches A 120A, 120B, 120C, 120D are shown in FIG. 1, within the scope of the present invention, additional multiple switches (for example, up to 50 switches in one aspect of the present invention) may be provided in the fiber channel fabric 100.

Figure 4:
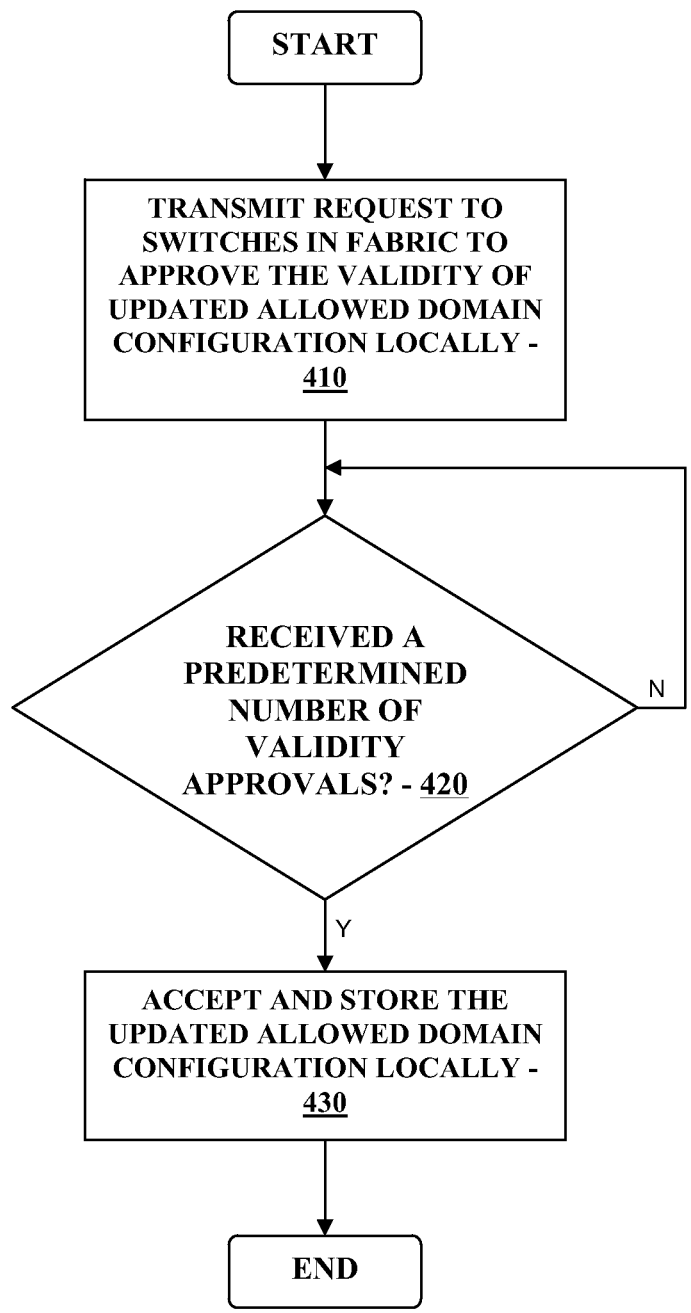
FIG. 4 is a flowchart illustrating the allowed domains assignment by the principal switch in the fabric in accordance with one embodiment of the present invention.

FIG. 4 is a flowchart illustrating the allowed domains assignment by the principal switch in the fabric in accordance with one embodiment of the present invention. Referring to FIG. 4, at step 410, the principal switch is configured to transmit request to the subordinate switches in the fabric to approve the validity of the update allowed domains configuration locally. Thereafter, at step 420, it is determined whether a predetermined number of validity approvals are received from the subordinate switches in the fabric. In other words, the updated allowed domain list as generated by the principal switch 110 in the fiber channel fabric 100 (FIG. 1) and described in conjunction with FIG. 3 above is configured to be distributed to all subordinate switches A 120A, 120B, 120C, 120D in the fibre channel fabric 100.

Referring back to FIG. 4, at step 420, if it is determined that a predetermined number of validity approvals from the subordinate switches is not received by the principal switch, as shown in the Figure, the routine continues to verify or check the number of validity approvals received by the principal switch until it is determined that the principal switch has received the predetermined number of validity approvals from the subordinate switches in the fabric.

On the other hand, referring yet again to FIG. 4, when it is determined at step 420 that a sufficient number (or a predetermined number) of validity approvals of the updated allowed domains configuration is received from subordinate switches, at step 430, the principal switch is configured to accept and store the updated allowed configuration locally, and the routine terminates. In other words, when the principal switch receives a predetermined number of validity approvals from subordinate switches in the fabric, the principal switch is configured to commit (that is, accept and save) the updated allowed domain configuration locally, as do the subordinate switches in the fabric that returned the validity approvals to the principal switch.

Figure 5:
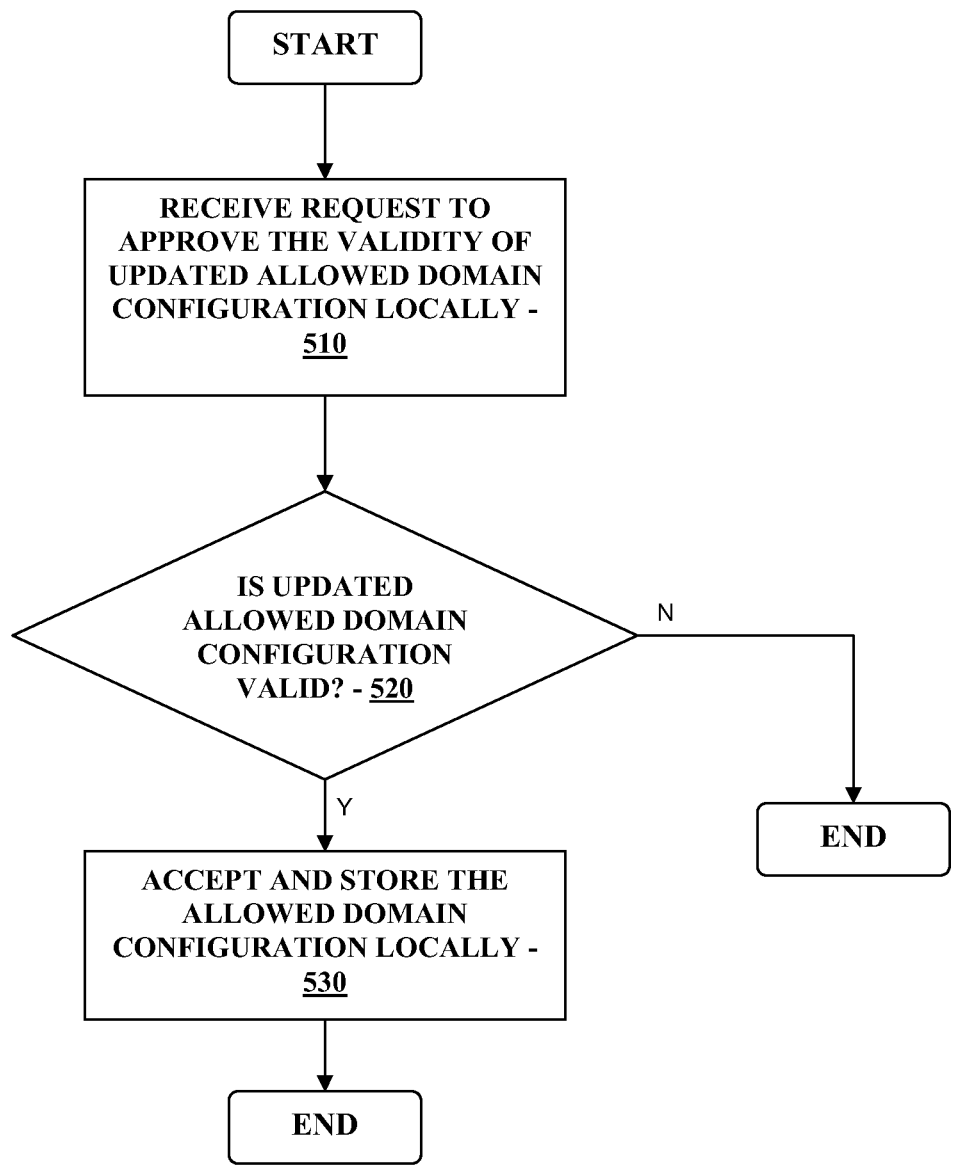
FIG. 5 is a flowchart illustrating subordinate switch configuration during the allowed domains assignment by the principal switch in the fabric in accordance with one embodiment of the present invention.

FIG. 5 is a flowchart illustrating subordinate switch configuration during the allowed domains assignment by the principal switch in the fabric in accordance with one embodiment of the present invention. Referring to FIG. 5, at step 510, request to approve the validity of updated allowed domain configuration locally is received by a subordinate switch in the fiber channel fabric 100 (FIG. 1). Thereafter, at step 520, it is determined whether the updated allowed domain configuration is valid. If it is determined that the updated allowed domain configuration received from the principal switch in not valid, then the routine terminates.

Referring back to FIG. 5, if at step 520 it is determined that the updated allowed domain configuration received from the principal switch is valid, then at step 530, the updated allowed domain configuration is accepted and stored locally by the subordinate switch. That is, when the subordinate switch determines that the updated allowed domain configuration received from the principal switch is valid, then it commits the received configuration locally, and thereafter permits additional configuration requests.

Figure 6A:
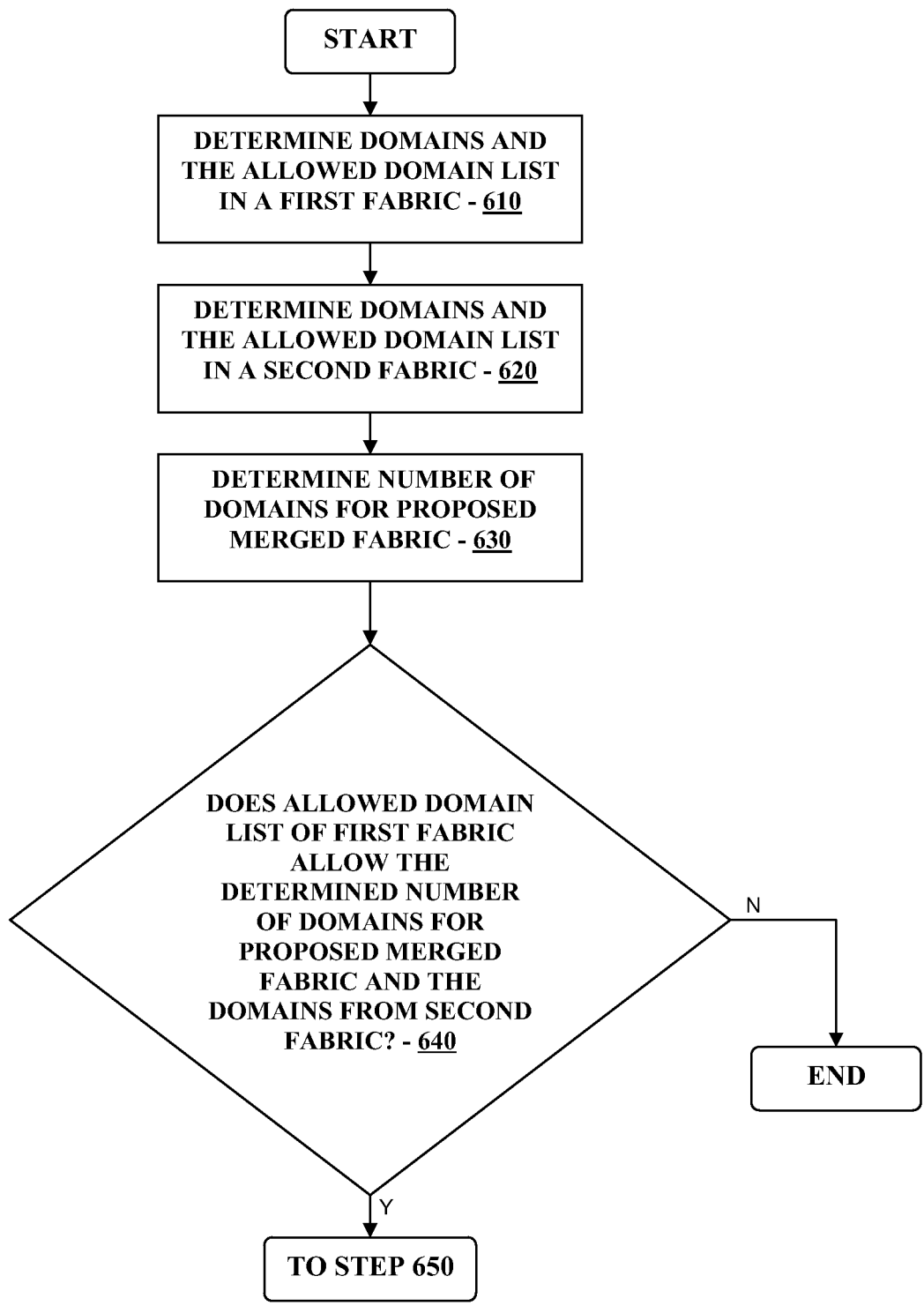
FIGS. 6A-6B are flowcharts illustrating fabric admission control with allowed domains in accordance with one embodiment of the present invention.
Figure 6B:
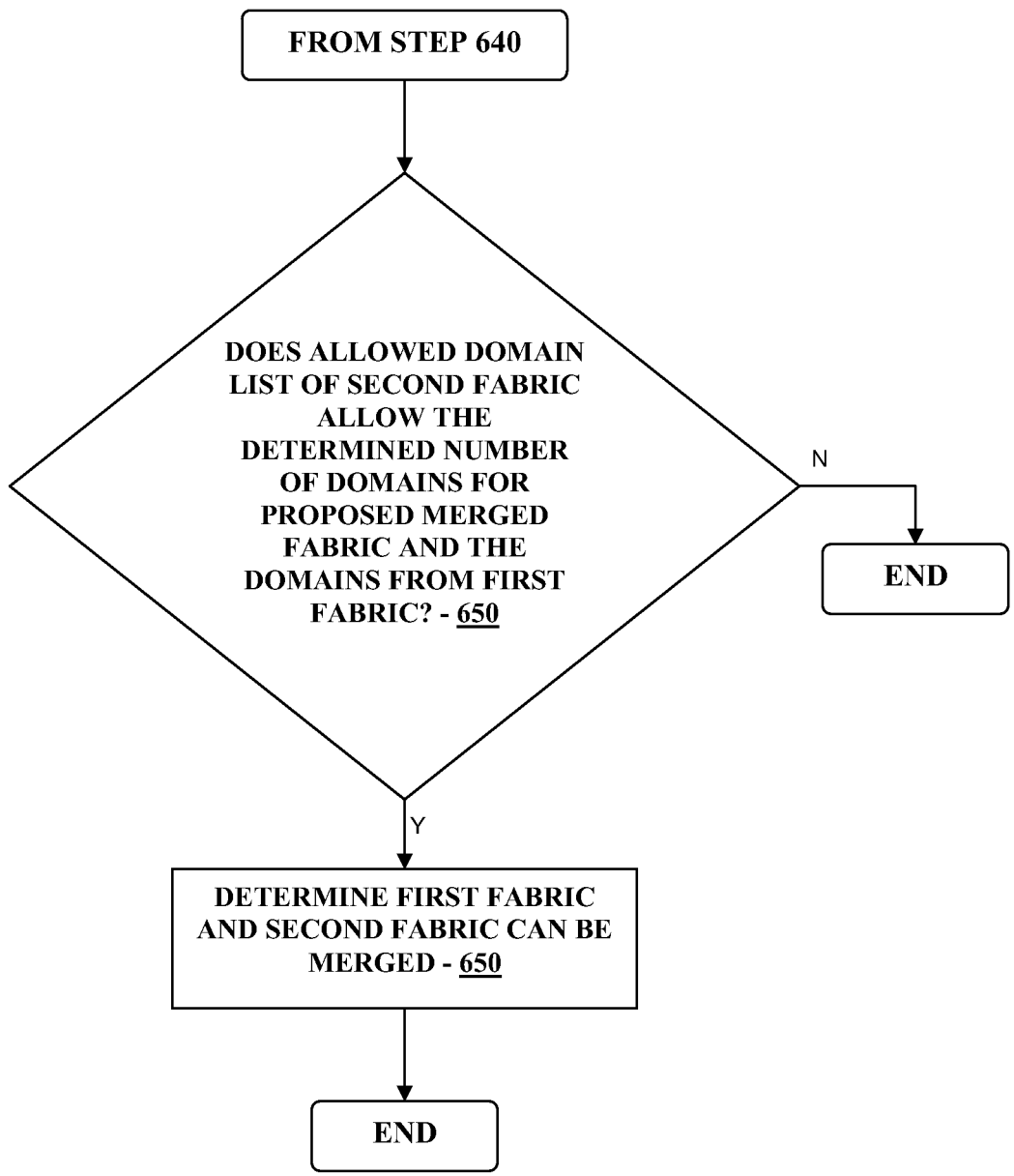

FIGS. 6A-6B are flowcharts illustrating fabric admission control with allowed domains in accordance with one embodiment of the present invention. Referring to FIGS. 6A-6B, at step 610, the domains and the allowed domain list in a first fabric is determined. For example, referring back to FIG. 2, the domains and the allowed domain list in the fiber channel fabric 210 is determined. Thereafter, at step 620, the domains and the allowed domain list in a second fabric is determined. Again, referring back to FIG. 2, the domains and the allowed domain list in the fiber channel fabric 220 is determined.

For example, at step 610 the determined domains and the allowed domain list for the first fabric may include domains 9, 10, 11, 12, and allowed domain list of 1-30, while at step 620, the determined domains and the allowed domain list for the second fabric may include domains 15, 16, 17 and allowed domains list of 10-20.

Referring back to FIG. 6A, after determining the domains and the allowed domain list in the first and second fabrics, at step 630, the number of domains for the proposed merged fabric is calculated. That is, in the example provided above, the number of domains for the proposed merged fabric including the first and the second fabrics include seven domains (including domains 9, 10, 11, 12 from the first fabric, and domains 15, 16, 17 from the second fabric). Thereafter at step 640, it is determined whether the allowed domain list of first fabric allows the determined number of domains for the proposed merged fabric and the domains from the second fabric.

That is, at step 640, it is determined whether the allowed domain list of the first fabric (1-30) allows the determined seven domains for the proposed merged fabric, and also, allows the domains from the second fabric (15, 16, 17). As can be seen, in this example, the determination at step 640 is affirmative. In other words, the allowed domain list of the first fabric (1-30) allows the seven domains for the proposed merged fabric, and also, the domains from the second fabric.

Referring back to FIG. 6A, if it is determined at step 640 that either the allowed domain list of the first fabric does not allow the determined number of domains for the proposed merged fabric, or that the allowed domain list of the first fabric does not allow the domains from the second fabric, then the routine terminates.

On the other hand, if at step 640 it is determined that the allowed domain list of the first fabric allows the determined number of domains for the proposed merged fabric, and also the domains from the second fabric, then the routine proceeds to step 650 as shown in FIG. 6B. Referring to FIG. 6B, at step 650, it is determined whether the allowed domain list of the second fabric allows the determined number of domains for the proposed merged fabric, and also, for the domains from the first fabric.

For example, at step 650, it is determined whether the allowed domain list of the second fabric (10-20) allows the seven domains for the proposed merged fabric, and further, whether the allowed domain list of the second fabric also allows the domains from the first fabric (9, 10, 11, 12). It can be seen from this example that this condition does not hold. That is, while the allowed domain list of the second fabric does allow for seven domains for the proposed merged fabric, the allowed domain list of the second fabric (10-20) does not allow all of the domains from the first fabric—that is, domain 9 which is not inclusive in the allowed domain list 10-20 of the second fabric.

Referring to FIG. 6B, if it is determined that the allowed domain list of the second fabric does not allow the determined number of domains for the proposed merged fabric, or that the allowed domain list of second fabric does not allow the domains from the first fabric, then the routine terminates. On the other hand, if at step 650 it is determined that the allowed domain list of the second fabric allows the determined number of domains for the proposed merged fabric, and also for the domains from the first fabric, then at step 660, it is determined that the first fabric and the second fabric may be merged.

Referring back to FIG. 2, in the case where it is determined that the first fabric 210 and the second fabric 220 may be merged, then logical topology of the fiber channel merged fabric as shown in the Figure will include the connection between the subordinate switch A 220C from the first fabric 210 and the subordinate switch B 240A in the second fabric 220.

Indeed, given the distributed allowed domains as discussed above, each fabric has a consistent and distributed allowed domain list among all switches in that fabric. When two fabrics merge, the allowed domains lists are not exchanged across the link before the port bringup. Rather, if a port is allowed to come up and it detects a conflict in the allowed domain lists after the port up (either by explicitly exchanging or violating the allowed domains in the currently assigned domains), link failures and/or data traffic disruption may occur.

Accordingly, in one embodiment of the present invention, the peer domain list is used so as to be provided with a list of domains in the other fabric in the network. By comparing the peer domain list with the local allowed domain list, the number of allowed domains needed for the joined fabric as well as the domains that will be allowed may be determined. In this manner, potential conflict may be detected and the port may be prevents from coming up rather than resulting in subsequent data traffic disruption. In one aspect, the domain lists themselves may be exchanged through Exchange Fabric Parameters (EFP) that includes one of the first frames exchanged across a link which contains the list of all domains in the fabric.

In the manner described above, in accordance with one embodiment of the present invention, the principal switch in a fabric may be configured to anticipate or predict and limit the domains the principal switch can assign, and further, to specify the domains the principal switch may set aside or "reserve" or no assign to other subordinate switches in the fabric.

More specifically, in one embodiment of the present invention, different resources may be configured to select a subset of domains (for example, the allowed domain list) as appropriate to be allowed in the fabric. Each resource may be identified by a unique resource ID, and is able to allow or disallow domains from the list of domains that are available to the principal switch to assign. When a request to configure an allowed domain list is received from a resource, a predetermined set of conditions are determined so as not to disallow the local domain and all current domains assigned in the fabric. For example, the predetermined set of conditions may include that the allowed domain list include the current configured domain ID, the current runtime domain ID, and all the current domains in the fabric. In this manner, the final allowed domain list is a function of all resource's configured allowed domain list.

Once a switch has the final allowed domain list, it is propagated to all other switches through a distribution protocol (for example, embedding in EFP Domain List updates), or through other distribution mechanisms including Cisco Fabric Services (CFS). In this manner, all switches in the fabric have the same allowed domain lists such that in the case where the principal switch changes, the same allowed domain policies may be applied. In other words, if the allowed domain list were only configured on the principal switch, if the principal switch changes in the fabric, then the new principal switch will not validate the allowed domain list of the prior principal switch since the new principal switch will have a different allowed domain list than the allowed domain list of the prior principal switch.

In this manner, in accordance with the various embodiments of the present invention, as a network design tool, each VSAN may be preconfigured to specify the subset of domains which all switches are to obtain. In addition, the method and system for distributed allowed domains in accordance with the various embodiments of the present invention helps in limiting the size of the fabric so as to prevent potential misconfiguration or rogue switches from joining the fabric, by for example, allocating from a subset of non overlapping allowable domains within the fabric.

In addition, in accordance with the various embodiments of the present invention, potential interoperability issues with other switches by, for example, limiting the range of domains by the principal switch to, for example, the least common denominator, of the number that each switch in the fabric may accept. Moreover, by helping to preclude domains of a transit VSAN to be assigned routes in the local VSAN, the inter-VSAN routing issues are also addressed.

Indeed, within the scope of the present invention, the method and system for distributed allowed domains allow for restriction of the range of allowable and assignable domains within a fabric, and further, to automatically assign the allowed domains by the principal switch to the subordinate switches in the fabric. Moreover, multiple fabrics may be merged based on fabric admission control procedure as described above so as to merge two or more fabrics in the fiber channel that does not result is domain conflict, nor potential data traffic disruption.

Accordingly, a method of providing distributed allowed domains in a fiber channel fabric in one embodiment of the present invention includes determining an allowed domain configuration of a resource, retrieving one or more current domain configuration parameters, determining a list of domains in a fiber channel fabric, and generating an updated allowed domain list for the resource in the fabric.

The step of retrieving the one or more current domain configuration parameters may include the steps of retrieving a current allowed domain configuration, retrieving a current domain identification information, and retrieving a current runtime domain identification information, where the current allowed domain configuration may include a range of allowable domains.

The step of generating an updated allowed domain list may include the steps of comparing the allowed domain configuration with the current allowed domain configuration, and identifying a subset of domain list based on the comparison step.

The step of identifying the subset of domain list in one embodiment may include comparing each of the list of domains, the current domain identification information, and the current runtime domain identification information, and defining the subset of the domain list to include the list of domains, the current domain identification information, and the current runtime domain identification information.

The method may further include assigning the updated allowed domain list to one or more switches in the fabric.

In one aspect, the step of assigning the updated allowed domain list may include transmitting a request to confirm validity of the updated allowed domain list, receiving a predetermined number of validity confirmation of the updated allowed domain list in response to the request, and locally storing the updated allowed domain list.

A method of providing distributed allowed domains in a fiber channel fabric in a further embodiment of the present invention includes receiving a request to approve a validity of an updated allowed domain configuration, determining the validity of the received updated allowed domain configuration, transmitting a validity approval based on the determining step, locally storing the updated allowed domain configuration.

The method may further include receiving one or more configuration requests.

Moreover, in a further aspect, the updated allowed domain configuration may also include an updated allowed domain list.

A method of controlling a fiber channel fabric admission based on distributed allowed domains in yet another embodiment of the present invention includes determining a list of domains and an allowed domain list of a first fabric, determining a list of domains and an allowed domain list of a second fabric, comparing the list of domains and the allowed domain list of the first and second fabrics, merging the first fabric and the second fabric based on the comparing step.

In one aspect, the step of comparing may include determining the allowed domain list of the first fabric includes the number of domains in the combined list of domains of the first and the second fabrics, determining the allowed domain list of the first fabric includes the list of domains in the second fabric, determining the allowed domain list of the second fabric includes the number of domains in the combined list of domains of the first and the second fabrics, and determining the allowed domain list of the second fabric includes the list of domains in the first fabric.

A system for providing distributed allowed domains in a fiber channel fabric in yet still another embodiment of the present invention includes a first switch configured to determine an allowed domain configuration, retrieve one or more current domain configuration parameters, determine a list of domains in a fiber channel fabric, and generate an updated allowed domain list for the resource in the fabric.

The first switch may be further configured to retrieve a current allowed domain configuration, retrieve a current domain identification information; and retrieve a current runtime domain identification information, where the current allowed domain configuration may include a range of allowable domains.

In a further aspect, the first switch may be further configured to compare the allowed domain configuration with the current allowed domain configuration, and identify a subset of domain list based on the comparison In addition, the first switch may be additionally configured to compare each of the list of domains, the current domain identification information, and the current runtime domain identification information, and define the subset of the domain list to include the list of domains, the current domain identification information, and the current runtime domain identification information.

In still another aspect, the first switch may be further configured to assign the updated allowed domain list to one or more second switches in the fabric.

Moreover, the first switch may additionally be configured to transmit a request to confirm validity of the updated allowed domain list, receive a predetermined number of validity confirmation of the updated allowed domain list in response to the request, and locally store the updated allowed domain list.

A system for providing distributed allowed domains in a fiber channel fabric in accordance with still yet another embodiment of the present invention includes means for determining an allowed domain configuration of a resource, means for retrieving one or more current domain configuration parameters, means for determining a list of domains in a fiber channel fabric, and means for generating an updated allowed domain list for the resource in the fabric.

A method of providing distributed domains in a fiber channel fabric in accordance with yet still a further embodiment of the present invention includes determining a domain configuration of a resource, retrieving one or more current domain configuration parameters, determining a list of domains in a fiber channel fabric, and generating an updated domain list for the resource in the fabric.

The step of retrieving the one or more current domain configuration parameters may include retrieving a current domain configuration, retrieving a current domain identification information, and retrieving a current runtime domain identification information, where the current domain configuration may include a range of allowable domains.

The step of generating an updated domain list may include comparing the domain configuration with the current domain configuration, identifying a subset of domain list based on the comparison step.

The step of identifying the subset of domain list may include comparing each of the list of domains, the current domain identification information, and the current runtime domain identification information, and defining the subset of the domain list to include the list of domains, the current domain identification information, and the current runtime domain identification information.

In addition, the method may also include the step of assigning the updated domain list to one or more switches in the fabric, which, in one embodiment, may include transmitting a request to confirm validity of the updated domain list, receiving a predetermined number of validity confirmation of the updated domain list in response to the request, and locally storing the updated domain list.

The updated domain list may include an allowed domain list.

The updated domain list may include a disallowed domain list.

In addition, the step of generating the disallowed domain list may include comparing the domain configuration with the current domain configuration, and identifying a disallowed subset of domain list based on the comparison step.

In this manner, in one aspect of the present invention, the principal switch in a fiber channel fabric may be configured with a subset of allowable or disallowable domains to assign to switches in the fabric a network design tool, and further, to help limit the size of the fabric to minimize or potentially prevent misconfiguration of certain switches (for example, rogue switches) from joining the fabric.

The various processes described above including the processes performed by the principal switch 110, the subordinate switches A 120A, 120B, 120C, 120D of FIG. 1, the principal switches A 210 and B 230, or the corresponding respective subordinate switches A 220A, 220B, 220C, 220D, and subordinate switches B 240A, 240A (FIG. 2) in the software application execution environment in the data network 100 including the processes and routines described in conjunction with FIGS. 3-6B, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the principal switch 110, the subordinate switches A 120A, 120B, 120C, 120D (FIG. 1), the principal switches A 210 and B 230, or the corresponding respective subordinate switches A 220A, 220B, 220C, 220D, and subordinate switches B 240A, 240A (FIG. 2) may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of providing distributed allowed domains in a fibre channel fabric, comprising:
    determining, by a primary switch configured to operate in the fibre channel fabric, a first allowed domain configuration of a resource of the fabric, wherein the first allowed domain configuration specifies a first range of domains;
    determining a second allowed domain configuration of the primary switch, wherein the second allowed domain configuration specifies a second range of domains differing from the first range;
    retrieving one or more current domain configuration parameters that are associated with the primary switch from a memory at the primary switch;
    determining, by the primary switch, a list of utilized domains that are currently being utilized in the fibre channel fabric;
    generating, by the primary switch, an updated allowed domain list that specifies an overlapping range of domains from the first and second ranges and that encompasses the one or more current domain configuration parameters and the list of utilized domains such that the updated allowed domain list includes only domains that all of the switches in the fabric are configured to allow, wherein the updated allowed domain list includes a plurality of fibre channel identification (FCID) domains that are assignable to other switches in the fibre channel fabric; and
    distributing the updated allowed domain list to each switch in the fabric so as request approval of such updated allowed domain list from each switch and for each switch to store such updated allowed domain list locally.

2. The method of claim 1, wherein retrieving the one or more current domain configuration parameters comprises:
    retrieving a current domain identification information; and
    retrieving a current runtime domain identification information.

3. The method of claim 1, wherein each of the first and second allowed domain configurations includes a range of allowable FCID domains.

4. The method of claim 2, wherein generating the updated allowed domain list comprises:
    comparing the first allowed domain configuration with the second allowed domain configuration; and
    identifying a subset of FCID domains based on the comparison.

5. The method of claim 4, wherein identifying the subset of FCID domains comprises:
    comparing each of the list of utilized domains, the current domain identification information, and the current runtime domain identification information; and
    defining the subset of FCID domains to include the overlapping range of domains that results from comparing the first and second allowed domain configuration, as well as the list of utilized domains, the current domain identification information, and the current runtime domain identification information.

6. The method of claim 1, further comprising assigning a selected FCID domain from the updated allowed domain list to another switch in the fabric.

7. The method of claim 6, wherein distributing the updated allowed domain list comprises:
transmitting, by the primary switch, one or more requests to confirm validity of the updated allowed domain list;
receiving a predetermined number of validity confirmations of the updated allowed domain list in response to the one or more requests; and
locally storing, at a memory of the primary switch, the updated allowed domain list.

8. A method of providing distributed allowed domains in a fibre channel fabric, comprising:
receiving, at a subordinate switch configured to operate in the fibre channel fabric, a request to approve a validity of an updated allowed domain configuration, the updated allowed domain configuration including a plurality of Fibre Channel Identification (FCID) domains assignable to switches in the fibre channel fabric and wherein the updated allowed domain configuration is associated with a primary switch that transmitted the request and is based on an overlapping range of a first allowed domain configuration of a resource, which specifies a first range of domains, and a second allowed domain configuration, which specifies a second range of domains differing from the first range, such that the updated allowed domain configuration includes only domains that all of the switches in the fabric are configured to allow;
determining the validity of the updated allowed domain configuration;
if the updated allowed domain configuration is determined to be valid,
transmitting, by the subordinate switch, a validity approval message; and locally storing, in a memory at the subordinate switch, the updated allowed domain configuration.

9. The method of claim 8, further comprising receiving one or more configuration requests.

10. A method of controlling a fibre channel fabric admission based on distributed allowed domains; comprising:
determining, by a switch configured to operate in a first or second fabric, a list of utilized domains utilized in the first fabric and an allowed domain list of the first fabric, the allowed domain list including a plurality of Fibre Channel Identification (FCID) domains assignable to switches in the first fabric;
determining by the switch a list of utilized domains utilized in a second fabric and an allowed domain list of the second fabric, the allowed domain list including a plurality of Fibre Channel Identification (FCID) domains assignable to switches in the second fabric;
determining whether the allowed domain list of the first fabric allows the list of utilized domains of the second fabric;
determining whether the allowed domain list of the second fabric allows the list of utilized domains of the first fabric; and
merging the first fabric and the second fabric only if it is determined that the allowed domain list of the first fabric allows the list of utilized domains of the second fabric and that the allowed domain list of the second fabric allows the list of utilized domains of the first fabric, otherwise terminating the merging of the first and second fabrics.

11. A system for providing distributed allowed domains in a fibre channel fabric, comprising:
a first primary switch operable in the fibre channel fabric and configured to:
determine a first allowed domain configuration of a resource of the fabric, wherein the first allowed domain configuration specifies a first range of domains;
determine a second allowed domain configuration of the primary switch, wherein the second allowed domain configuration specifies a second range of domains differing from the first range;
retrieve, from a memory of the first primary switch, one or more current domain configuration parameters that are associated with the first primary switch;
determine a list of utilized domains that are currently being utilized in the fibre channel fabric;
generate, by a processor of the first primary switch, an updated allowed domain list that specifies an overlapping range of domains from the first and second ranges and that encompasses the allowed domain configuration of the resource, the one or more current domain configuration parameters and the list of utilized domains such that the updated allowed domain list includes only domains that all of the switches in the fabric are configured to allow, wherein the updated allowed domain list includes a plurality of fibre channel identification (FCID) domains that are assignable to switches in the fibre channel fabric; and
distribute the updated allowed domain list to each switch in the fabric so as request approval of such updated allowed domain list from each switch and for each switch to store such updated allowed domain list locally.

12. The system of claim 11, wherein the first primary switch is further configured to:
retrieve a current domain identification information; and
retrieve a current runtime domain identification information.

13. The system of claim 11, wherein each of the first and second allowed domain configurations includes a range of allowable domains.

14. The system of claim 12, wherein the first primary switch is further configured to:
compare the first allowed domain configuration with the second allowed domain configuration; and
identify a subset of domains list based on the comparison.

15. The system of claim 14, wherein the first primary switch is further configured to:
compare each of the list of utilized domains, the current domain identification information, and the current runtime domain identification information; and
define the subset of domains to include the overlapping range of domains that results from comparing the first and second allowed domain configuration, as well as the list of utilized domains, the current domain identification information, and the current runtime domain identification information.

16. The system of claim 11, wherein the first primary switch is further configured to assign a selected FCID domain from the updated allowed domain list to one or more second switches in the fabric.

17. The system of claim 16, wherein the first primary switch is configured to distribute the updated allowed domain list by:
transmitting a request to confirm validity of the updated allowed domain list;

receiving a predetermined number of validity confirmations of the updated allowed domain list in response to the request; and locally storing the updated allowed domain list.

18. A system for providing distributed allowed domains in a fibre channel fabric, comprising:

means for determining, by a primary switch configured to operate in the fibre channel fabric, a first allowed domain configuration of a resource of the fabric, wherein the first allowed domain configuration specifies a first range of domains;

means for determining a second allowed domain configuration of the primary switch, wherein the second allowed domain configuration specifies a second range of domains differing from the first range;

means for retrieving, from a memory of the switch, one or more current domain configuration parameters that are associated with the switch;

means for determining, by the primary switch, a list of utilized domains that are currently being utilized in the fibre channel fabric;

means for generating, by the primary switch, an updated allowed domain list that specifies an overlapping range of domains from the first and second ranges and that encompasses the one or more current domain configuration parameters, and the list of utilized domains such that the updated allowed domain list includes only domains that all of the switches in the fabric are configured to allow, wherein the updated allowed domain list includes a plurality of fibre channel identification (FCID) domains that are assignable to other switches in the fibre channel fabric; and means for distributing the updated allowed domain list to each switch in the fabric so as request approval of such updated allowed domain list from each switch and for each switch to store such updated allowed domain list locally.

19. A method of providing distributed domains in a fibre channel fabric, comprising:

determining, by a primary switch configured to operate in the fibre channel fabric, a first allowed domain configuration of a resource of the fabric, wherein the first allowed domain configuration specifies a first range of domains;

determining, by the primary switch, a second allowed domain configuration of the primary switch, wherein the second allowed domain configuration specifies a second range of domains differing from the first range;

retrieving, from a memory of the primary switch, one or more current domain configuration parameters that are associated with the primary switch;

determining, by the primary switch, a list of utilized domains that are currently being utilized in the fibre channel fabric; and generating, by the switch, an updated allowed domain list that specifies an overlapping range of domains from the first and second ranges and that encompasses the one or more current domain configuration parameters, and the list of utilized domains such that the updated allowed domain list includes only domains that all of the switches in the fabric are configured to allow, wherein the updated allowed domain list includes a plurality of fibre channel identification (FCID) domains that are assignable to switches in the fibre channel fabric.

20. The method of claim 19, wherein retrieving the one or more current domain configuration parameters comprises:

retrieving a current domain identification information; and retrieving a current runtime domain identification information.

21. The method of claim 20, wherein each of the first and second allowed domain configurations includes a range of allowable FCID domains.

22. The method of claim 20, wherein generating an updated domain list comprises:

comparing the first allowed domain configuration of the resource with the second allowed domain configuration; and identifying a subset of domains based on the comparison.

23. The method of claim 22, wherein identifying the subset of domains comprises:

comparing each of the list of utilized domains, the current domain identification information, and the current runtime domain identification information; and defining the subset of domains to include the overlapping range of domains that results from comparing the first and second allowed domain configuration, as well as the list of utilized domains, the current domain identification information, and the current runtime domain identification information.

24. The method of claim 19, further assigning a selected FCID domain from the updated domain list to one or more switches in the fabric.

25. The method of claim 24, further comprising:

transmitting by the primary switch a request to confirm validity of the updated domain list;

receiving a predetermined number of validity confirmations of the updated domain list in response to the request; and locally storing the updated domain list at the primary switch.

26. The method of claim 19, wherein the updated domain list includes an allowed domain list.

27. The method of claim 19, wherein the updated domain list includes a disallowed domain list.

28. The method of claim 27, wherein the one or more current domain configuration parameters includes a current domain configuration, and generating the disallowed domain list comprises:

comparing the first allowed domain configuration of the resource with the second allowed domain configuration; and identifying a disallowed subset of domains based on the comparison.

* * * * *